Jan. 4, 1949. E. V. BUNTING 2,458,249
ADJUSTABLE WHEEL AND AXLE ASSEMBLY
Filed Nov. 13, 1944 3 Sheets-Sheet 1
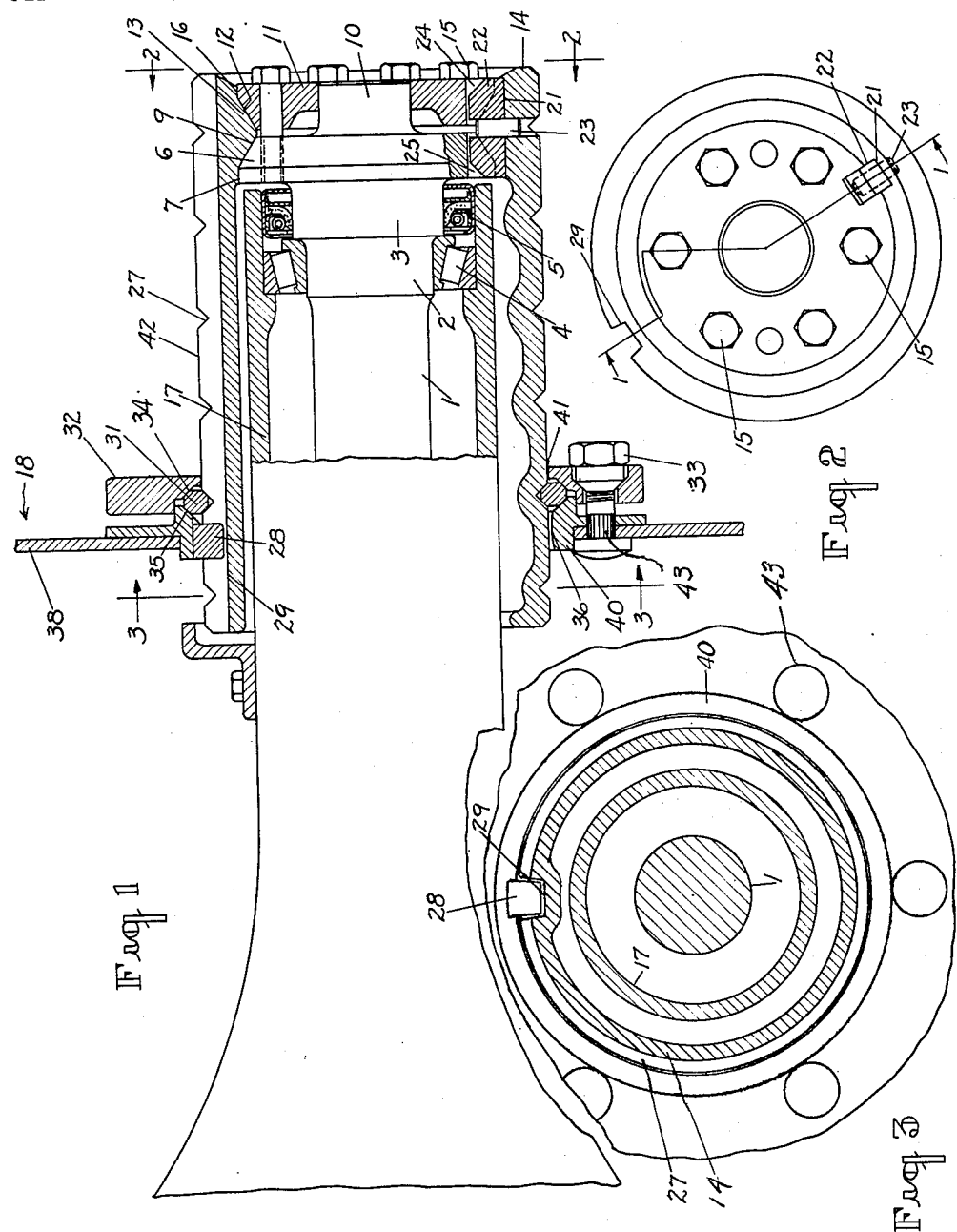
INVENTOR.
Ernest V. Bunting
BY
Barnes, Kisselle, Laughlin & Raisch
Attorneys

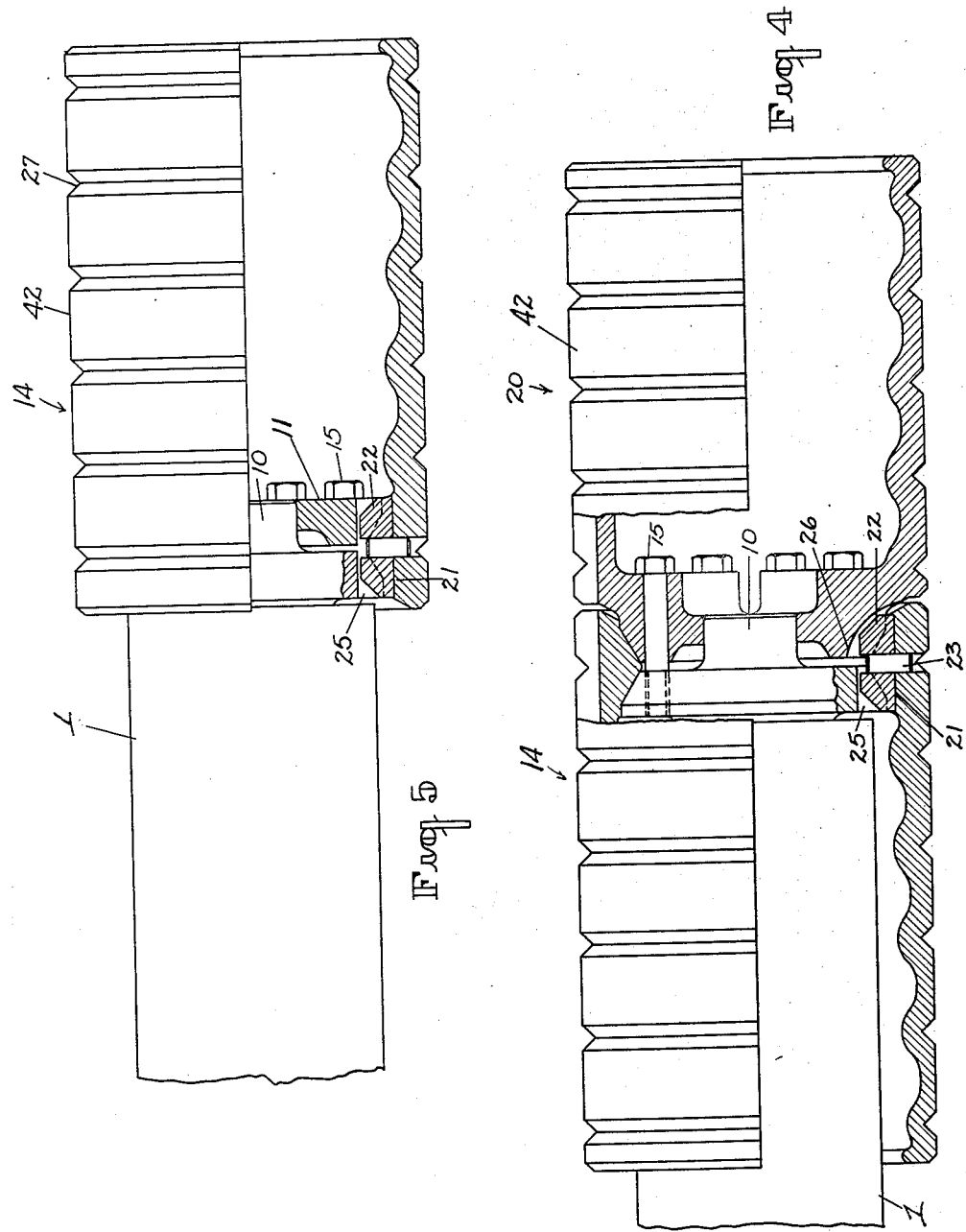

Jan. 4, 1949.  E. V. BUNTING  2,458,249
ADJUSTABLE WHEEL AND AXLE ASSEMBLY
Filed Nov. 13, 1944  3 Sheets-Sheet 3
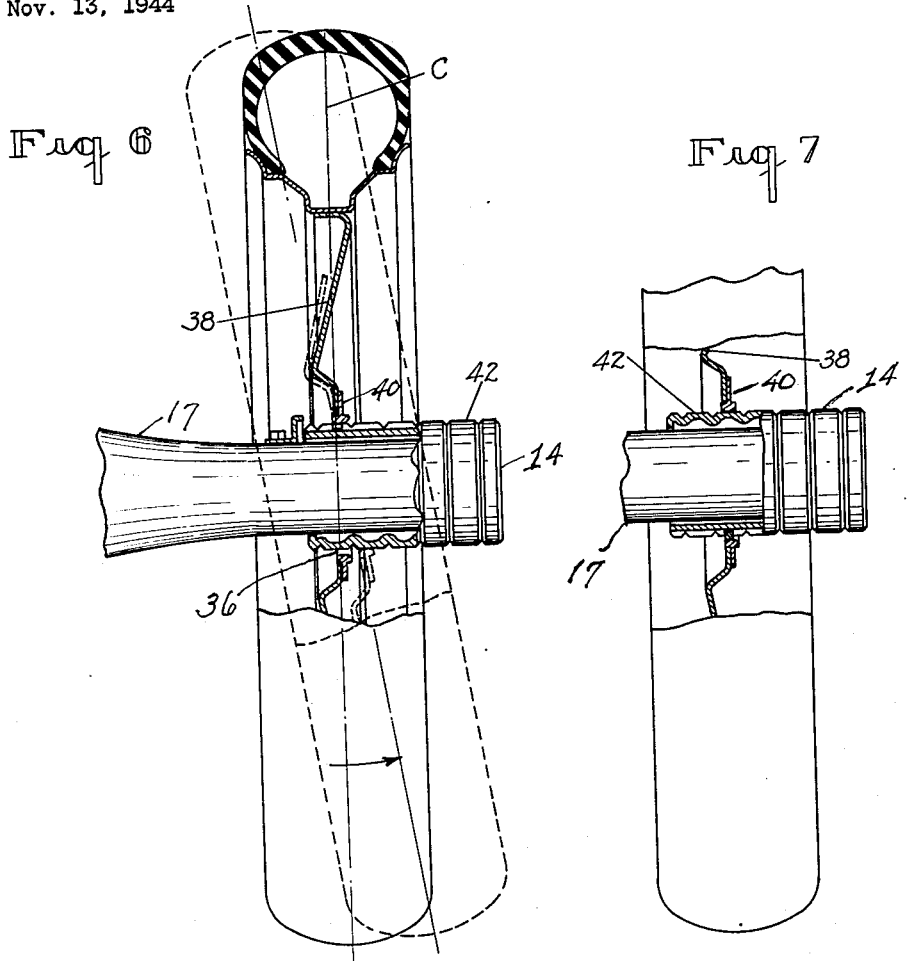
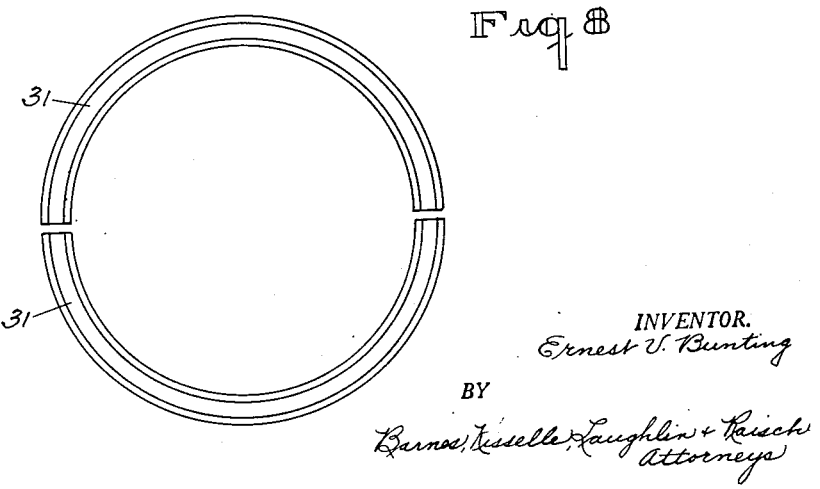
INVENTOR.
Ernest V. Bunting
BY
Barnes, Kisselle, Laughlin & Raisch
Attorneys Patented Jan. 4, 1949

2,458,249

UNITED STATES PATENT OFFICE 2,458,249

ADJUSTABLE WHEEL AND AXLE ASSEMBLY

Ernest V. Bunting, Dearborn, Mich., assignor to Harry Ferguson, Inc., Dearborn, Mich., a corporation of Delaware Application November 13, 1944, Serial No. 563,247

18 Claims. (Cl. 301—9)

This invention relates to a wheel hub and axle assembly by which the wheel gauge of the vehicle can be easily altered. It has been heretofore proposed to alter the wheel gauge of tractors and heavy vehicles by reversing wheels offset from their hubs and thereby changing the position of the wheel along the axle. But tractor wheels are very heavy, sometimes weighing six hundred pounds or more and it is very difficult for the user of a tractor to lift such a wheel. Extension axles and extension hubs have also been proposed, but so far as I am advised these require the lifting of the wheel or at least the shoving and sliding of the wheel in order to make an adjustment. This may be very difficult with heavy wheels or when the surfaces are not in good condition for sliding.

It is the object of my invention to afford a variable wheel tread by an adjustable hub or axle assembly in which the wheel may be "hitched" or "walked" along the supporting hub or axle by tilting the wheel and then revolving the wheel so that the lower part of the wheel advances when no load is present and is turned to the upper position where it assumes the load. The upper portion of the wheel, which has borne the load, then can be allowed to swing to the advanced position from which it in turn may be swung to a second advanced position and the "hitching" operation repeated until the desired position is reached.

The wheel is clamped in place upon the hub or axle preferably by means of a special split ring clamp which, I believe, to be novel for wheel anchorage.

The wheel support or hub is an enlarged drum, which in the narrow wheel gauge positions, is nested over the rear axle housing. This allows the bearing for the axle to be placed at the extreme end of the axle housing. This provides better support in all positions of adjustment of the wheel.

Referring to the drawings:

Fig. 1 is a longitudinal section through the rear axle of a tractor showing my adjustable wheel support.

Fig. 2 is an end elevation of the same taken on line 2—2 of Fig. 1.

Fig. 3 is a section on the line 3—3 of Fig. 1.

Fig. 4 shows the same hub but with a hub-extension bolted in place to increase the range of the wheel gauge variation.

Fig. 5 shows the hub reversed to alter the position of the range of wheel track adjustment.

Fig. 6 is a view showing how wheels may be tipped upon the wheel support.

Fig. 7 shows how the wheel has been "hitched" to the next land to the right on the wheel support.

Fig. 8 is a view of the split ring.

I designates the rear axle of a tractor. The axle has enlargements 2 and 3 to seat the roller bearing set 4 and the oil seal 5. An enlarged head 6 is provided with an accurately finished cylindrical portion 7 to pilot the wheel support or hub 14 into place and a beveled or conical portion 9 to seat and frictionally wedge a complemental surface on an annular internal rib 13 on the hub 14 when the latter is bolted in place. Projecting from the center of the head is a pilot 10 which centers the cap 11. This cap has a peripheral portion 12 which is conical to fit another complemental surface on the annular internal rib 13. An annular row of cap screws 15 bolts the cap to the head or end of the axle. The cylindrical pilot surfaces 7 and 8, the beveled annular rib 13 and the beveled surfaces 6 and 12 accurately seat the hub on the end of the axle so as to assure correct centering and avoidance of all eccentricity and to insure that all the longitudinal surfaces of the hub are truly parallel with the axis of the axle. This is important to avoid an eccentric wheel tread or tire and to avoid the wheel wobbling.

In Fig. 5 the hub or wheel support is bolted to the end of the rear axle by plate 11 which fits into the hub or support from the remote end after the hub has been reversed from the position shown in Fig. 1. Here the hub or wheel support projects beyond the end of the axle and does not nest over the axle housing 17. The range of the adjustment will be the same but the position of the range is different.

In Fig. 4 the regular hub nested over the axle housing is shown and an extension 20 is provided. The inner end is closed except for an opening to fit over the pilot 10 of the axle. Bolts 15 bolt the extension to the end of the axle and also clamp the regular hub or wheel support 14 onto the axle. The same accurate pilot surfaces and bevels are provided on the extension to properly center and make parallel the hub and axle.

The annular internal rib 13 of the hub has a keyway or groove 21 into which fits a key 22 which is pinned in place by pin 23. This key engages in keyways 24 and 25 in the cap 11 and axle head 6 respectively. This ties the live axle, the hub and hub cap in driving relationship. The same relationship obtains when an extension hub is used, as in Fig. 4 except here keyway 26 is in the end of the extension hub.

The wheel 18 is clamped in place upon the hub at any one of the lands 42 along the hub. The location of the wheel is determined by which groove 27 the clamping ring is seated in. A key 28 is in the keyway 29. The wheel disk 38 is so shaped and the annulus 40 is so placed that when the wheel rests loosely upon and is unclamped from the hub the wheel is balanced in vertical radial plane of the axle on the narrow inner securing annulus 40 suitably fixed to disk by the serrated bolts 43 being drawn into the disk and the annulus. A pair of spring steel ring segments 31 are sprung in the V-grooves—each is of slightly less radius than the bottom of the groove so it has to be expanded to be fitted into the groove. The segments are of octagonal cross-section conveniently formed from octagonal bar stock. A clamping ring 32 is slid over the hub and bolts and nuts are put in place and turned down to tighten the wheel center and the ring upon the ring segments 31. The clamping ring is provided with an internal piloting face 41 and a beveled surface 34 and the wheel center piece is provided with a beveled surface 35 to contact with two of the sides of the octagonal ring segments 31. This arrangement, when the nuts 33 are turned down, pulls the ring, the segments and the hub tightly together and clamps the wheel securely to the hub in accurate perpendicular and concentric position.

To change the position of the wheel the nuts are loosened and removed, the ring 32 removed, the wheel walked inwardly and the ring segments pried out of the groove, the tractor being, of course, jacked up at such time so that the wheel does not bear any load from the tractor while it is being adjusted. The wheel opening has clearance with respect to the hub preferably on the order of about one-sixteenth of an inch greater radius than the exterior diameter of the hub. This leaves a clearance 36 below the hub of about one-eighth of an inch. The center piece narrow face is on radial plane through center of gravity as shown in Fig. 1. The wheel center annulus 40 is quite narrow so that the large clearance and the narrowness of the sleeve portion of the center piece allows tilting of the wheel, as shown in Fig. 6. One seizes the under side of the wheel and rocks the wheel, within the limits of the clearance, as shown in Fig. 6, either in or out—whichever way the change of position is to be made. With tractor out of gear the wheel is revolved one-half a turn (see Fig. 7) and this brings the rocked or advanced point of contact of wheel and hub to the upper position where the load of the wheel is transferred to this advanced point of contact. In other words, the wheel is "hitched" or "walked" along the hub without lifting or sliding by this tilting and rolling of the wheel. When the wheel is allowed to swing back to vertical or perpendicular position, the whole wheel has been advanced and again rests upon a land 42 between grooves. The operation can be repeated until the wheel has reached the land where it is to be clamped in place. The wheel may be "hitched" or "walked" along the whole wheel hub or the wheel hub and extension hub without much effort and without the necessity of lifting the heavy wheel or sliding the heavy wheel along a hub which may offer considerable resistance by reason of friction or rust, etc.

The sleeving or nesting over the rear axle housing of the wheel support I consider an important feature as it allows the placing of the bearing 4 near the end of the axle housing where it can be most effective when the wheel is either on the nested hub or upon the extension hub 20 shown in Fig. 4. Other features are simplicity of construction, few parts, reversability with single hub (wheel reversal required) and the wide range of adjustment with extension hub not requiring wheel removal.

What I claim is:

1. An adjustable wheel and axle assembly, having in combination an axle provided with a wheel support, a wheel and means for clamping the wheel upon the support with considerable clearance, the said wheel upon release of the clamping means dropping down upon the top of the wheel support to give increased clearance below the wheel support, whereby the wheel may be tipped and then turned with the axle to "hitch" or "walk" the wheel to a new position on the wheel support where the clamping means may again clamp the wheel in place, the said clamping means comprising split ring means to seat the wheel upon the support and a clamping ring for forcing and holding the wheel on the said split ring means in concentric position and perpendicular to said axle.

2. An adjustable wheel and axle assembly, having in combination an axle provided with a wheel support, a wheel provided with a wheel center piece and means for clamping the wheel upon the support with considerable clearance, the said wheel upon release of the clamping means dropping down upon the top of the wheel support to give increased clearance below the wheel support, thereby the wheel may be tipped and then turned with the axle to "hitch" or "walk" the wheel to a new position on the wheel support where the clamping means may again clamp the wheel in place, the said clamping means comprising split ring means with beveled surfaces for seating the wheel at given positions upon the support and a clamping ring with a beveled surface cooperating with the beveled surface of the split ring means and a beveled surface upon the wheel center piece for forcing and holding the wheel into concentric and perpendicular position with respect to the axle.

3. An adjustable wheel and axle assembly, having in combination an axle provided with a wheel support, a wheel provided with a wheel center piece and means for clamping the wheel upon the support with considerable clearance, the said wheel upon release of the clamping means dropping down upon the top of the wheel support to give increased clearance below the wheel support, whereby the wheel may be tipped and then turned with the axle to "hitch" or "walk" the wheel to a new position on the wheel support where the clamping means may again clamp the wheel in place, the said clamping means comprising ring means with beveled surfaces for seating the wheel at given positions upon the support and a clamping ring with a beveled surface cooperating with the beveled surface of the first-mentioned ring and a beveled surface upon the wheel center piece for forcing and holding the wheel into concentric and perpendicular position with respect to the axle, said ring means comprising spring ring segments.

4. An adjustable wheel and axle assembly, having in combination an axle, a hub, means for securing the hub to the end of the axle, a wheel provided with a wheel center piece having a central opening of substantially larger diameter than the hub, and means for clamping the center piece to the hub in spaced relation to give substantial clearance around the hub whereby when the clamping means is released the wheel drops down upon the hub to increase the clearance below the hub and allow the tipping of the wheel and rotation of the wheel and hub to "hitch" the wheel along the hub to a new location where it may be again clamped in place, said hub being provided with spaced annular grooves to receive the said clamping means when the wheel is located adjacent a groove.

5. An adjustable wheel and axle assembly, having in combination an axle, a hub, means for securing the hub to the end of the axle, a wheel provided with a wheel center piece having a central opening of substantially larger diameter than the hub, and means for clamping the center piece to the hub in spaced relation to give substantial clearance around the hub whereby when the clamping means is released the wheel drops down upon the hub to increase the clearance below the hub and allow the tipping of the wheel and rotation of the wheel and hub to "hitch" the wheel along the hub to a new location where it may be again clamped in place, said hub provided with spaced annular grooves and the clamping means comprising ring segments which can be located in a groove adjacent the wheel center, said clamping means comprising a ring which can be bolted to the wheel center, the clamping ring, ring segments and wheel center cooperating to force the wheel into concentric, spaced and perpendicular relation to the hub.

6. An adjustable wheel and axle assembly, having in combination an axle, a hub, means for securing the hub to the end of the axle, a wheel provided with a wheel center piece having a central opening of substantially larger diameter than the hub, and means for clamping the center piece to the hub in spaced relation to give substantial clearance around the hub whereby when the clamping means is released the wheel drops down upon the hub to increase the clearance below the hub and allow the tipping of the wheel and rotation of the wheel and hub to "hitch" the wheel along the hub to a new location where it may be again clamped in place, said hub being provided with spaced annular grooves and the clamping means comprising ring segments which can be located in a groove adjacent the wheel center and a ring which can be bolted to the wheel center, the ring segments, the ring and the wheel center having bevelled surfaces, cooperating when the clamping is done to force the wheel into concentric, spaced and perpendicular relation to the hub.

7. An adjustable wheel and axle assembly, having in combination an axle, a hub, means for bolting the hub to the end of the axle, a wheel provided with a wheel center piece having a central opening of substantially larger diameter than the hub, and means for clamping the center piece to the hub in spaced relation to give substantial clearance around the hub whereby when the clamping means is released the wheel drops down upon the hub to increase the clearance below the hub and allow the tipping of the wheel and rotation of the wheel and hub to "hitch" the wheel along the hub to a new location where it may be again clamped in place, said hub being provided with spaced annular grooves of V-cross-section and the clamping means comprising ring segments of octagonal cross-section which can be located in a groove adjacent the wheel center and a clamping ring which can be bolted to the wheel center, the clamping ring, ring segments and wheel center cooperating when the clamping is done to force the wheel into concentric, spaced and perpendicular relation to the hub.

8. An adjustable wheel and axle assembly, having in combination an axle, a hub, means for securing the hub to the end of the axle in nested relation or in reversed projecting relation, a wheel provided with a wheel center piece having a central opening of substantially larger diameter than the hub, and means for clamping the center piece to the hub in spaced relation to give substantial clearance around the hub whereby when the clamping means is released the wheel drops down upon the hub to increase the clearance below the hub and allow the tipping of the wheel and rotation of the wheel and hub to "hitch" the wheel along the hub to a new location where it may again be clamped in place.

9. An adjustable wheel and axle assembly, having in combination an axle, a hub, means for securing the hub to the end of the axle in nested relation or in reversed projecting relation, a wheel provided with a wheel center piece having a central opening of substantially larger diameter than the hub, means for clamping the center piece to the hub in spaced relation to give substantial clearance around the hub whereby when the clamping means is released the wheel drops down upon the hub to increase the clearance below the hub and allow the tipping of the wheel and rotation of the wheel and hub to "hitch" the wheel along the hub to a new location where it may again be clamped in place, and an extension hub which can be bolted onto the end of the axle with the first mentioned hub when that hub is in nested position with respect to the axle.

10. A wheel and axle assembly, having in combination, an axle housing, an axle therein, a bearing for supporting the same in the housing and located close to the end of the axle housing, a wheel support in the form of a drum having a mounting surface at one end and extending radially inwardly substantially enclosing the end of the axle and abuttingly bolted thereto, said drum extending nestingly over the axle housing, and a wheel having a drum-receiving aperture therein enabling it to be adjustably positioned along said drum to vary the wheel gauge.

11. A wheel and axle assembly, having in combination an axle housing, an axle therein, a bearing for supporting the same in the housing and located near the end of the axle housing, a wheel support in the form of a hub having an inwardly extending end wall and nested over the axle housing, a wheel adjustable along the hub by "hitching" due to a loose center when released to allow tilting and rotating of the tilted wheel and axle, and means for fastening said end wall to the end of said axle, said end wall and said fastening means being entirely contained within the confines of the outer diameter of the body portion of said hub so that said wheel may be "hitched" free of said hub.

12. A wheel and axle assembly having in combination a hub, a wheel comprising an annulus, a rim and connecting and supporting means between the annulus and the rim, the said wheel elements arranged to balance the wheel in a vertical radial plane of the hub when the wheel rests loosely upon the hub, the said annulus having a relatively narrow portion at the center opening which opening is substantially larger than the hub to provide clearance between the annulus and the hub to permit substantial tilting of the wheel on the hub when the wheel rests loosely on the hub, and means for fastening the wheel to the hub and for holding the annulus and the wheel in true concentric relation with the said hub.

13. A wheel and axle assembly having in combination a hub, a wheel comprising an annulus, a rim and a disc between the annulus and the rim, the said elements of the wheel arranged to balance the wheel in a vertical radial plane of the hub when the wheel rests loosely upon the hub, said annulus having a relatively narrow portion at the center and having a central opening substantially larger than the hub to provide clearance between the annulus and the hub to permit substantial tilting of the wheel on the hub when the wheel rests loosely on the hub, a clamping ring, ring segments and bolts by which the wheel may be secured to the hub, the said annulus, ring segments and clamping ring provided with complementary pilot surfaces to hold the wheel in accurate concentric relation with the hub when clamped thereto.

14. In an assembly of the general type set forth, the combination with an axle presenting a wheel support of cylindrical exterior contour, of a wheel having a round center opening dimensioned to receive said support with a substantial clearance thereabout, together with means for releasably securing said wheel to said support in concentricity therewith, whereby upon release of said securing means said wheel is freed to drop down on the support with increased clearance beneath the latter in condition to be "hitched" along said support.

15. In an assembly of the general type set forth, the combination with an axle presenting a wheel support of cylindrical exterior contour, of a wheel having a round center opening dimensioned to receive said support with a substantial clearance thereabout, together with means including a squeeze clamp encircling said support and arranged for constriction about the same for releasably securing said wheel to said support at selected points along the latter's length and for simultaneously centering said wheel with reference to the axis of said support, whereby upon the release of said squeeze clamp said wheel is freed to drop down on the support with increased clearance beneath the latter in condition to be "hitched" along said support.

16. A wheel and axle assembly comprising, in combination, an axle housing, an axle therein, a bearing supporting said axle within said housing, a cup-shaped hub telescoped over the end of said housing, fastening means including bolts for accurately centering the outwardly presented end of said cup-shaped hub on the presented end of said axle in face-to-face abutment as the bolts are tightened, and a wheel secured to the outer wall of said hub, said fastening means being constructed and arranged so that the combined wheel and hub may be freely slid from said housing merely upon the unfastening of said bolts.

17. In a wheel and axle assembly, the combination comprising an axle, a hub mounted on said axle and presenting an extensive cylindrical surface, a disc wheel having a relatively thin web with an aperture in the center thereof enabling the wheel to be telescoped over said hub and axially positioned thereon, an annular reinforcement on the raw inner edge of said web for protecting the same and presenting a flared edge, spaced parallel grooves in the periphery of said hub, a removable ring member which may be positioned to lie in a selected groove, means for clamping the positioned ring member against the flared edge of said reinforcement to fix the latter on said hub in a coaxially centered relation, the width of said reinforcement being appreciably wider than individual ones of said grooves and the flaring being sufficiently gentle so that the wheel may be "hitched" along said hub without substantial detenting in said grooves in the course of "hitching" movement.

18. An adjustable wheel and axle assembly, having in combination an axle, a hub mounted thereon and presenting a cylindrical outer surface, a wheel having a central disk portion with an opening formed therein for telescoping over said hub but having sufficient radial clearance with the disk portion resting on said hub to enable substantial tipping of said disk portion with respect to the hub axis thereby to permit the wheel to be "hitched" axially along the hub by repeated tipping and axial pull on the wheel to successively advance its point of contact on the hub, said hub having a series of indentations axially spaced therealong, fastening means on said disk portion for engaging a selected one of said indentations for concentric clamping of said wheel at a desired axial position on said hub, the opening in said disk portion being smoothly circular to eliminate detenting, and thus facilitate smooth "hitching" of the wheel along the hub.

ERNEST V. BUNTING.

REFERENCES CITED

The following references are of record in the file of this patent:

UNITED STATES PATENTS

| Number | Name | Date |
|---|---|---|
| 1,669,731 | Ash | May 15, 1928 |
| 1,822,093 | Hendrickson et al. | Sept. 8, 1931 |
| 1,979,598 | Ash | Nov. 6, 1934 |
| 2,099,194 | Brown | Nov. 16, 1937 |
| 2,151,045 | Ploehn | Mar. 21, 1939 |